June 21, 1932.  C. W. CHRIST  1,864,406
ROTARY ENGINE
Filed May 9, 1930   4 Sheets-Sheet 1

Fig.1.

Inventor.
Charles W. Christ

By Geo. P. Kimmel
Attorney

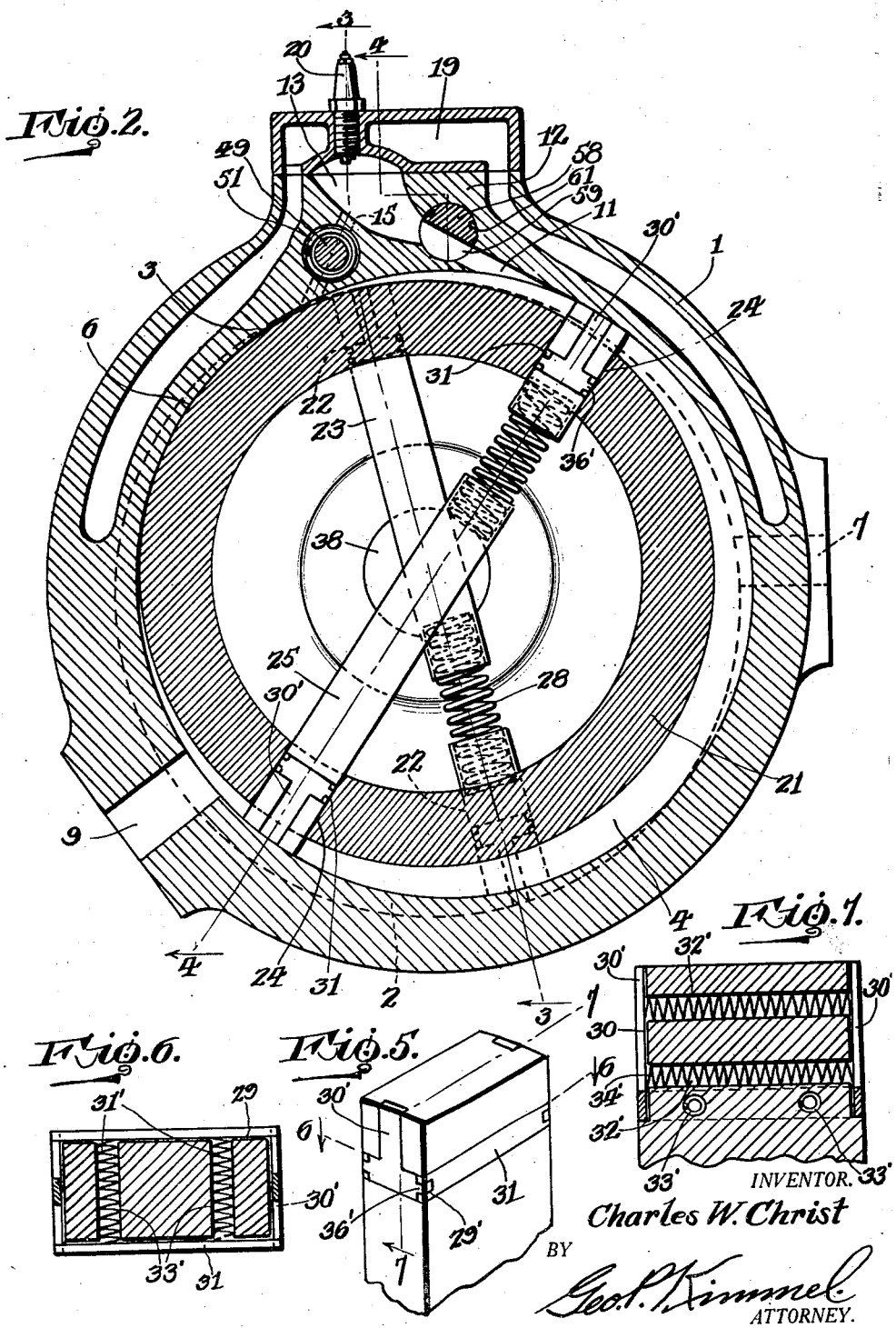

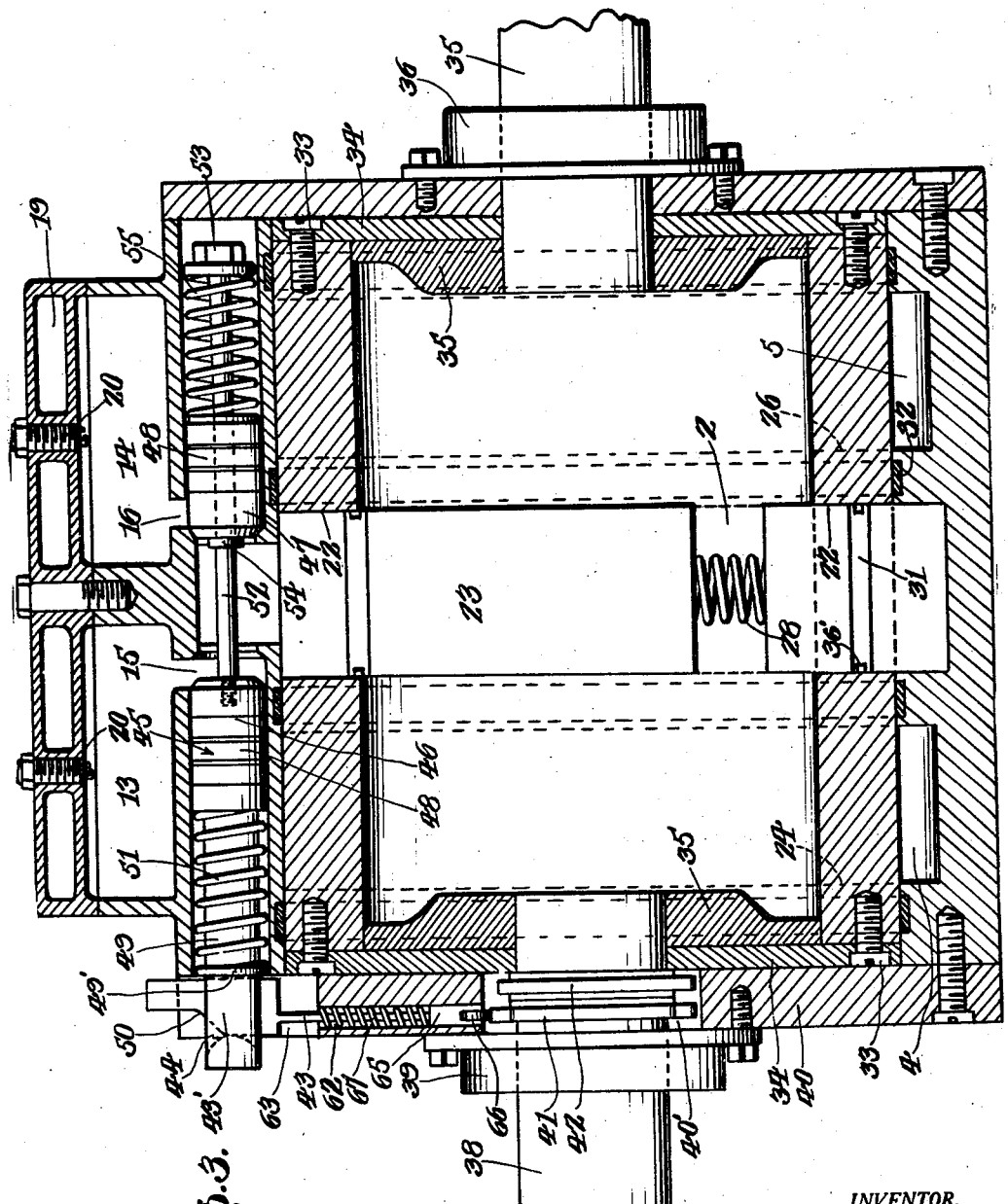

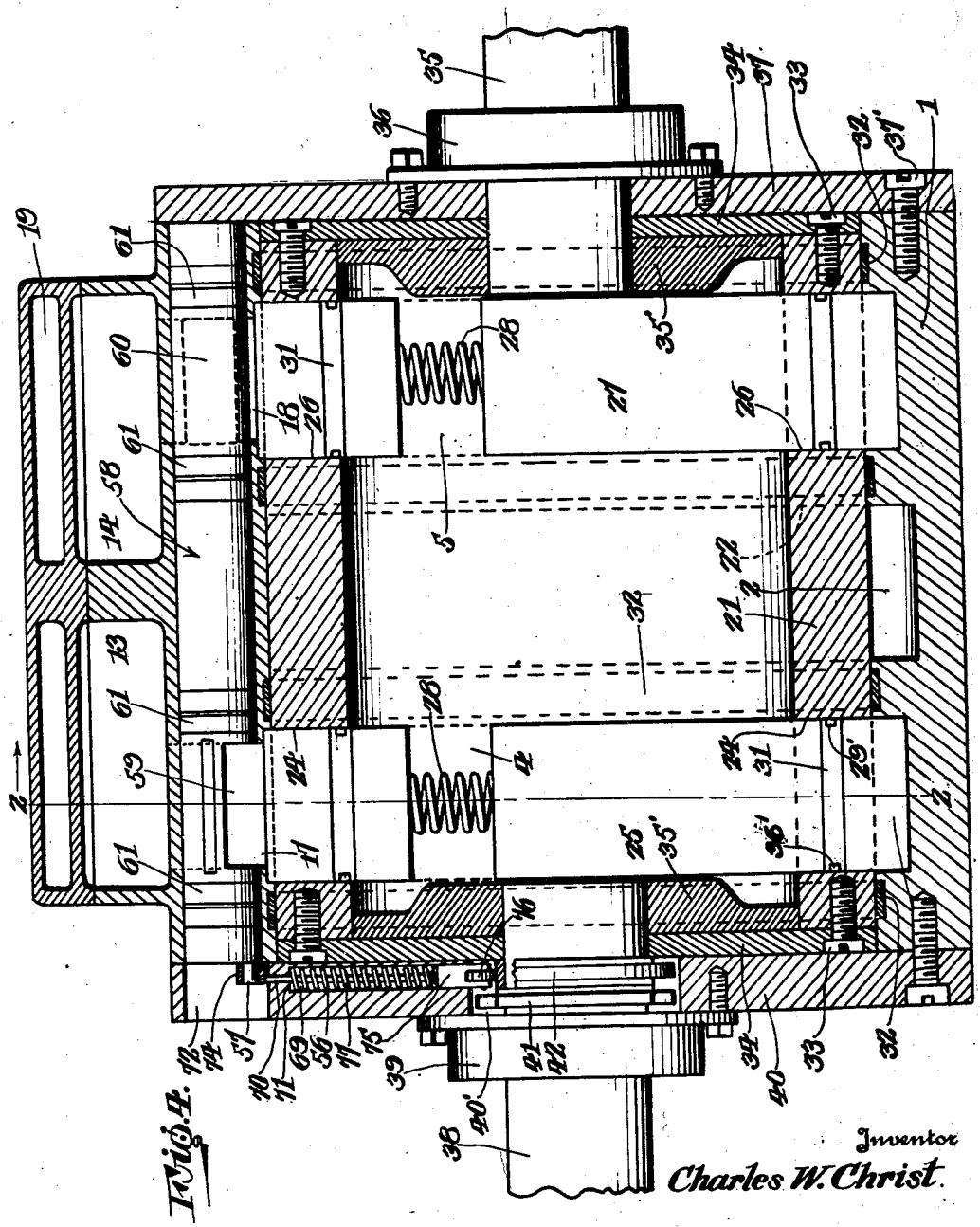

Patented June 21, 1932

1,864,406

UNITED STATES PATENT OFFICE

CHARLES W. CHRIST, OF KANSAS CITY, MISSOURI

ROTARY ENGINE

Application filed May 9, 1930. Serial No. 451,153.

This invention relates to a rotary engine and has for its primary object to provide, in a manner as hereinafter set forth, a rotary engine of new and improved construction which includes a rotor equipped with compression and firing blades operating within spaced grooves formed in a housing within which the rotor is mounted.

With the foregoing and other objects in view, the invention consists of the novel construction, combination and arrangement of parts as hereinafter more particularly described, and as illustrated in the accompanying drawings, wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is an end elevation of a rotary engine in accordance with this invention.

Figure 2 is a vertical transverse section therethrough taken at a point indicated by the line 2—2 of Figure 4.

Figure 3 is a longitudinal section taken at a point indicated by the line 3—3 of Figure 2.

Figure 4 is a longitudinal section taken at a point indicated by the line 4—4 of Figure 2.

Figure 5 is an enlarged fragmentary perspective view of one of the rotor blades.

Figure 6 is a section taken on the line 6—6 of Figure 5.

Figure 7 is a section taken on the line 7—7 of Figure 5.

Referring to the drawings in detail, the numeral 1 designates a housing which is of substantially cylindrical construction and which is formed in its inner peripheral face with a circumferentially extending groove 2 which hereinafter will be termed a compression groove. The groove 2 is disposed midway between the ends of the housing 1 and is substantially crescent shaped, being flush with the inner peripheral face of the housing 1 at a point indicated at 3, and gradually increasing in depth in opposite directions from the point 3. In spaced relation to the compression groove 2, the housing 1 is formed in its inner peripheral face with a pair of circumferentially extending grooves 4 and 5 which hereinafter will be termed firing grooves. The grooves 4 and 5 are substantially crescent shaped and are disposed on opposite sides of the groove 2. The groove 4 is flush with the inner peripheral face of the housing 1 at a point indicated at 6 and gradually increases in depth in opposite directions from the point 6. The groove 5 is in direct alignment with the groove 4 longitudinally of the housing 1. Extending through the wall of the housing 1 is an intake port 7 which opens into the compression groove 2, and which is suitably connected with a fuel supply pipe 8. Opening through the wall of the housing 1 and communicating with the firing grooves 4 and 5 are a pair of exhaust ports, such as 9, which are connected with an exhaust manifold 10 emptying into a common exhaust pipe 11.

At the top thereof the housing 1 is formed with a thickened portion 12 which is provided with a pair of combustion chambers 13 and 14 arranged in alignment longitudinally of the housing. The chambers 13 and 14 are provided with ports 15 and 16 respectively leading from the compression groove 2. The chambers 13 and 14 are further provided with exhaust ports 17 and 18 respectively which are in communication with the firing grooves 4 and 5. The housing 1 is provided with a water jacket 19 which partially surrounds the chambers 13 and 14, and is further provided with a pair of spark plugs 20 which extend into the chambers 13 and 14.

Disposed within the housing 1 is a rotor 21 which is of cylindrical construction and which is formed with a pair of diametrically opposed slots 22 through which the ends of a compression blade 23 extend. The rotor 21 is further formed with a pair of diametrically opposed slots 24 through which the ends of a firing blade 25 extend. The slots 24 are arranged in circumferentially spaced relation to the slots 22. In alignment with the slots 24, longitudinally of the rotor, the latter is formed with a pair of diametrically opposed slots 26 through which the ends of a firing blade 27 extend. Each of the blades 23, 25 and 27 is formed by a pair of sections of oblong formation in cross section connected together by means of a compression spring 28. The housing 1 is provided in its inner peripheral face with a packing ring 32 on each side of each of the grooves 2, 4 and 5, for snug engagement with the outer peripheral face of the rotor 21.

In spaced relation to each end thereof, each of the blades is formed with a transverse groove 29 extending entirely around the blade and in communication with a pair of grooves 30 formed in the edge faces of the blade and extending longitudinally thereof from the groove 29 to the end of the blade. Disposed within the groove 29, at opposite sides of the blade, are a pair of packing members 31 which are formed in their end faces with notches 29'. Disposed within the grooves 29 and 30, at opposite edges of the blade, are a pair of substantially T shaped packing members 30'. The portions of the members 30' which are disposed within the groove 29 are formed with reduced end portions 36' extending into the notches 29'. Extending through the blade are right angularly disposed pairs of spaced openings 31' and 32' within which are disposed springs 33' and 34' respectively. The ends of the springs 33' abut the packing members 31, and the ends of the springs 34' abut the packing members 30' whereby the packing members 31 and 30' are forced outwardly into contacting relation to the walls of the slot in the rotor through which the blade extends.

Secured to the ends of the rotor 21, by means of suitable holdfast devices 33, are a pair of end plates 34, each of which is provided with a thickened central portion 35' disposed within the rotor. One of the end plates 34 is fixedly mounted on a drive shaft 35 which extends through the end plate and which is journaled in a bearing 36 carried by a closure plate 37 secured to the housing 1, by means of suitable holdfast devices 37'. The other end plate 34 is fixedly mounted on a cam shaft 38 which extends through the end plate and which is journaled in a bearing 39 carried by a relatively thick closure plate 40 secured to the housing 1. Inwardly of the bearing 39, the cam shaft 38 is provided with a pair of cams 41 and 42, which are located within a circular opening 40' formed centrally of the plate 40.

Operated by the cam 41 is a slide bar 43 having a head 43' which slidably extends through a slot 44 formed in a slide valve indicated generally at 45 and which extends longitudinally of the housing 1 through the thickened wall portion 12 thereof. The slide valve 45 includes a pair of oppositely disposed closure members 46 and 47 which respectively control the ports 15 and 16 into the combustion chambers 13 and 14. The closure members 46 and 47 are provided with suitable packing rings 48 to prevent leakage past the closure members in outward directions. The closure member 46 is formed on or secured to an elongated cylindrical bar 49 through which the slot 44 is formed. The head 43' is formed with a cammed face 50 for engagement with a wall of the slot 44 by the reciprocation of the slide bar 43. The cammed face 50 is maintained in engagement with the outer wall of the slot 44 by means of a compression spring 51, the respective ends of which abut against the closure member 46 and a collar 49' slidably mounted on the bar 49 and engaging the head 43'. Fixedly secured to the inner end of the closure member 46 is a rod 52 which slidably extends through the closure member 47 and which is provided at its outer end with a flanged nut 53. Formed integrally with or fixedly secured to the rod 52, in spaced relation to the closure member 46, is a collar 54. The closure member 47 is maintained in engagement with the collar 54 by means of a compression spring 55, the respective ends of which abut the closure member 47 and the flanged nut 53. The slide valve 45 is reciprocated by means of the slide bare 43 to alternately open and close the ports 15 and 16.

Operated by the cam 42 is a push rod 56, the outer end of which is pivotally connected with a pin 57 eccentrically mounted on one end of an elongated, rotary valve indicated generally at 58. The valve 58 extends longitudinally of the housing 1 through the thickened portion 12 thereof. The valve 58 is of solid, cylindrical formation and extends across the ports 17 and 18 leading from the combustion chambers 13 and 14 to the firing grooves 4 and 5. In alignment with the ports 17 and 18, transversely of the housing, the valve 58 is formed with segmental recesses 59 and 60 which are substantially 90° out of alignment longitudinally of the valve 58. A reciprocating rotary motion is imparted to the valve 58 by operation of the push rod 56, by means of which the recesses 59 and 60 alternately brought into registry with the ports 17 and 18 to establish communication between the combustion chambers 13 and 14 and the firing grooves 4 and 5. On each side of each of the recesses 59 and 60, the valve 58 is provided with a packing ring 61 to prevent any leakage from the ports 17 and 18 when the recesses 59 and 60 are in registry therewith.

The slide bar 43 which operates the slide valve 45 is preferably of cylindrical construction and is extended through a bore 62 formed in the closure plate 40 and extending radially thereof. The outer end of the bore 62 terminates in spaced relation to the peripheral face of the plate 40, and opening into the outer end of the bore is a slot 63 formed in the periphery of the plate and extending transversely thereof. The width of the slot 63 is less than the diameter of the bore 62, whereby a shoulder 64 is formed at the outer end of the bore. Secured to the inner end of the slide bar 43 is a plunger 65 to which is pivotally connected a roller 66 for engagement with the cam 41. The roller 66 is maintained in engagement with the cam 41 by means of a spring 67 which encircles the slide bar 43, and the respective ends of which abut against the shoulder 64 and plunger 65. The slot 63 is of appropriate size to receive the head 43' of the slide bar 43 therein, and is provided centrally thereof with a circular enlargement 68 through which the outer end of the cylindrical bar 49 projects. The cam 41 is formed with a high peripheral portion and a low peripheral portion of equal lengths whereby the slide bar is reciprocated once during each revolution of the cam, with the strokes of the slide bar occurring at equal intervals so long as the speed of the cam remains constant.

The push rod 56 which operates the rotary valve 58 is preferably of cylindrical construction and is extended through a bore 69 formed in the closure plate 40 and extending radially thereof. The bore 69 is formed with a reduced outer end portion 70 whereby a shoulder 71 is provided in the bore. The reduced portion 70 opens into a circular opening 72 extending transversely through the plate 40 in alignment with the valve 58. The pin 57 projects into the opening 72 and through an elongated opening 73 in a head 74 formed on the outer end of the push rod 56. Pivotally connected to the inner end of the push rod 56 is a plunger 75 which is provided with a roller 76 for engagement with the cam 42. The roller 76 is maintained in engagement with the cam 42 by means of a spring 77 which encircles the push rod 56, and the respective ends of which abut against the shoulder 71 and plunger 75. The cam 42 is formed with a high peripheral portion and a low peripheral portion of equal lengths whereby the push rod is reciprocated once during each revolution of the cam, with the strokes of the push rod occurring at equal intervals so long as the speed of the cam remains constant. The longitudinal plane of the bore 69 is off center with respect to the valve 58 whereby reciprocating rotary motion is imparted to the valve by the reciprocation of the push bar 56.

Upon the rotation of the rotor 21, the passage of an end portion of the compression blade 23 over the intake port 7 sets up a suction whereby gas is drawn from the intake port into the compression groove 2 behind such end portion of the blade 23. When the opposite end of the blade 23 passes the intake port 7, a suction is set up to draw gas into the groove 2 behind such end portion of the blade, and the gas which was drawn into the groove 2 in advance of such end portion of the blade is compressed by the latter and forced through one of the ports 15 and 16, for example the port 15 into the combustion chamber 13. The operation of the slide valve 45 is timed with respect to the operation of the compression blade 23 so as to open one of the ports 15 and 16 simultaneously with the compression of gas within the compression groove 2 by one end of the blade 23. Upon the passage of the compressed gas through the port 15, the slide valve 45 operates to close the port 15, and to open the port 16 for receiving the next charge of gas compressed within the compression groove 2.

Immediately following the closing of the port 15, the rotary valve 58 operates to open the port 17, and simultaneously with the opening of the port 17, the charge within the chamber 13 is exploded by means of the spark plug extending thereinto, and the exploded gas is driven through the port 17 against the rear face of an end portion of the firing blade 25, such end portion being located directly in front of the port 17 at the time the explosion in the chamber 13 occurs. The impact of the exploded gas against the blade 25 imparts the rotary motion to the rotor 21, and the burned gas following the blade 25 is forced through the exhaust port 9 by the opposite end of the blade 25, such opposite end following directly behind the burned gas within the groove 4. The slide valve 45 is timed to alternately admit gas to the chambers 13 and 14, while the rotary valve 58 is timed to alternately exhaust gas through the ports 17 and 18 for alternately driving the blades 25 and 27.

Initial motion of the rotor 21 may be imparted in any suitable manner, such as providing one of the shafts 35 and 38 with a crank, not shown. While the shaft 38 has been defined as a cam shaft, obviously the shaft 38 may be utilized as a power shaft the same as the shaft 35, if desired, and the cams 41 and 42 may be optionally placed on either of the shafts 35 and 38. The particular type of cams 41 and 42 employed, and the manner of the operation of the slide bar 43 and push rod 56 thereby is optional, so long as the slide valve 45 is timed to alternately open the ports 15 and 16 at the completion of the compression strokes of the opposite ends of the compression blade 23, and so long as the rotary valve 58 is timed to alternately open the ports 17 and 18 when the firing blades 25 and 27 are brought into position to receive the impact of the exploded gas from the combustion chambers 13 and 14.

It is thought the many advantages of a rotary engine in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. In a rotary engine having a pair of spaced ports, a slide valve comprising a pair of oppositely disposed closure members for said ports, a rod rigidly connected with one of said members and slidably connected with the other of said members, tension means normally forcing the closure member rigidly connected with said rod inwardly to its closure position, stop means on said rod for opening the closure member slidably connected therewith when the closure member rigidly connected therewith is closed, means for opening the closure member rigidly connected with the rod, and tension means for maintaining the closure member slidably connected with the rod in engagement with said stop means to provide for the closing of the closure member slidably connected with the rod when the closure member rigidly connected therewith is open.

2. In a rotary engine, a scavenging blade rectangular in cross section and formed in spaced relation to one end thereof with a groove extending transversely around the blade, said blade further formed in opposite side faces thereof with longitudinally extending grooves extending from the transverse groove to said end of the blade, said blade having a pair of bores extending transversely therethrough and opening into said longitudinal grooves, said blade further having a pair of bores extending transversely therethrough and opening into said transverse groove at alternate sides of the blade with respect to the longitudinal grooves, T-shaped packing members on the sides of the blade having the longitudinal grooves and disposed within the longitudinal and transverse grooves, elongated packing members disposed within the transverse groove at said alternate sides of the blade, said elongated and T-shaped packing members being dovetailed together at the corners of the blade, a pair of springs extending through the bores opening into the longitudinal grooves and having their ends in abutment with the T-shaped packing members, and a pair of springs extending through the bores opening into the transverse groove and having their ends in abutment with said elongated packing members.

In testimony whereof, I affix my signature hereto.

CHARLES W. CHRIST.